United States Patent [19]

Takahashi et al.

[11] 4,281,338

[45] Jul. 28, 1981

[54] SOLID STATE COLOR IMAGING APPARATUS

[75] Inventors: Kenji Takahashi, Kodaira; Shusaku Nagahara, Hachioji; Kazuhiro Sato; Masuo Umemoto, both of Tokyo; Toshiyuki Akiyama, Kokubunji; Morishi Izumita, Inagi, all of Japan

[73] Assignee: Hitachi, Ltd., Tokyo, Japan

[21] Appl. No.: 70,816

[22] Filed: Aug. 29, 1979

[30] Foreign Application Priority Data

Sep. 6, 1978 [JP] Japan ................. 53-108640

[51] Int. Cl.³ .............................................. H04N 9/07
[52] U.S. Cl. ........................................ 358/44; 358/41
[58] Field of Search ................................ 358/44, 41

[56] References Cited

U.S. PATENT DOCUMENTS 4,054,906  10/1977  Yamanaka ........................... 358/44

*Primary Examiner*—Richard Murray
*Attorney, Agent, or Firm*—Craig and Antonelli

[57] ABSTRACT

In a solid state color imaging apparatus comprising photo sensitive element arrays arranged horizontally and vertically, means for reading out parallel photo signals of the photo sensitive element arrays on two horizontal lines and delivering the read out photo signals to first and second output circuits, and a mosaic color filter disposed in front of the photo sensitive elements and having luminance filtering counterparts arranged horizontally and vertically one after the other and two types of color filtering counterparts arranged at the remaining positions and on alternate horizontal lines, the horizontal clock from the reading out means has a frequency of 7.16 MHz so that color difference signals having the chrominance subcarrier component of 3.58 MHz are directly obtained in the first and second output circuits.

7 Claims, 8 Drawing Figures

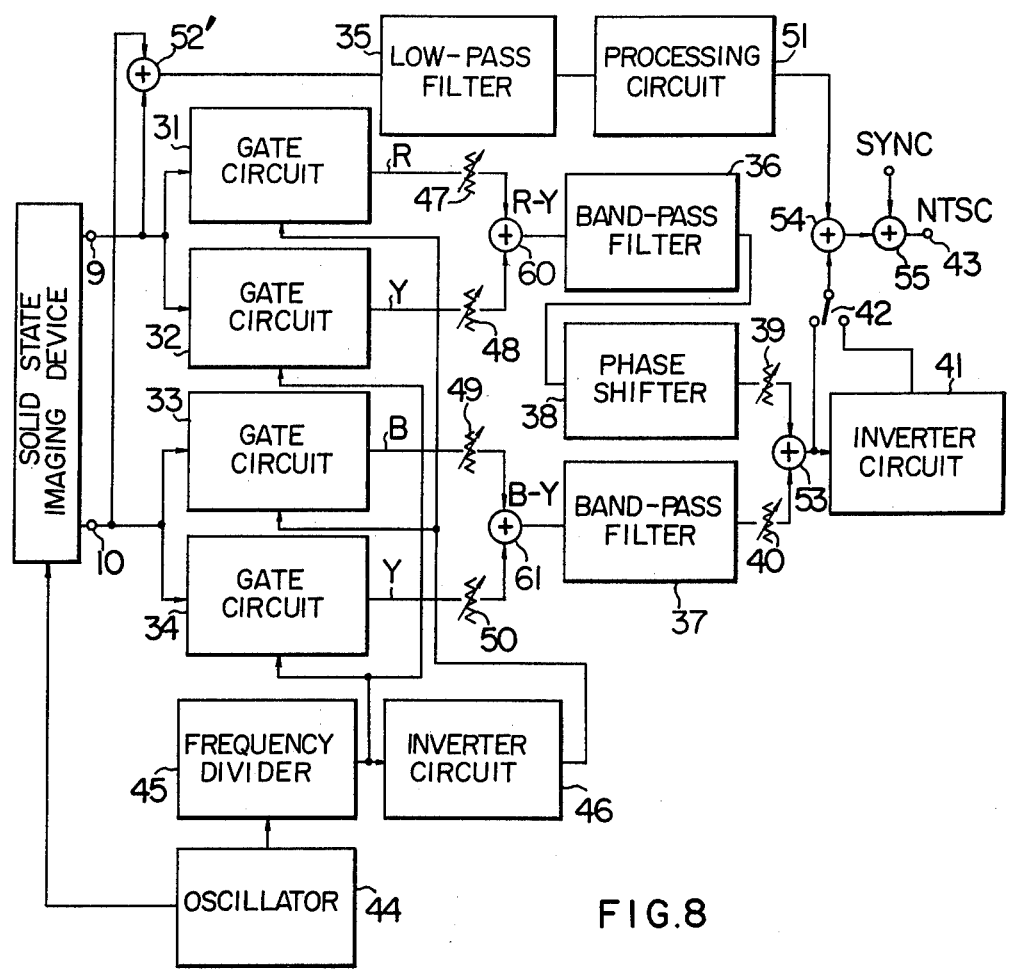

SOLID STATE COLOR IMAGING APPARATUS

This invention relates to solid state color imaging apparatus and more particularly, to a solid state color imaging apparatus wherein a signal processing circuit is simplified which converts output signals from photo sensitive elements arranged two-dimensionally in a solid state imaging device into an NTSC composite color signal.

Recently, active development and research has been directed to a color television camera of the type which utilizes a single state imaging device because it is compact and light and is expected to be inexpensive.

The solid state imaging device includes a large number of photo sensitive elements such as for example photodiodes arranged horizontally and vertically and a color filter covering surfaces of the photo sensitive elements and having red, green and blue color filtering counterparts in register with the respective photo sensitive elements. When the photo sensitive elements are scanned, video signals corresponding to the color filtering counterparts covering the surfaces of the respective photo sensitive elements are successively delivered out from the single solid state imaging device in accordance with the order of the scanning.

In a known solid state color television camera according to the prior art, red (R), green (G) and blue (B) signals delivered out from the solid state imaging device are respectively passed through associated processing circuits and encoder circuits and then put together to form an NTSC composite color signal.

The processing circuit has to include at least a clamping circuit for fixing the DC component of the R, G or B signal, a blanking signal insertion circuit and a clipper circuit, and a highly precise temperature stability is required of the processing circuit in order to maintain the color balance. The encoder circuit includes at least a matrix circuit for deriving a luminance signal (Y) and color difference signals (R−Y, B−Y) from each of the R, G and B signals, low pass filters and balanced modulators for deriving a chrominance subcarrier signal from the R−Y and B−Y signals. Therefore, in the prior art solid state color television camera, the processing circuit of the output signals from the solid state imaging device requires a large number of circuit components, resulting in a complicated circuit construction which prevents reduction in the cost of manufacture thereof.

Accordingly, it is an object of this invention to provide a solid state color imaging apparatus which can convert color video signals delivered out from a single solid state imaging device into an NTSC composite color signal with a simplified processing circuit.

According to the invention, the above object can be accomplished by providing a solid state color imaging apparatus comprising a plurality of photo sensitive elements arranged horizontally and vertically in an array; a signal reading out circuit scanning the plurality of photo sensitive element with parallel scanning of the photo sensitive element arranged on sets of two horizontal lines and delivering photo signals from the photo sensitive elements to first and second output circuits associated with the two horizontal lines of the respective sets; a mosaic color filter having luminance filtering counterparts arranged horizontally and vertically one after the other and first and second filtering counterparts arranged at the remaining positions of the mosaic and on alternate horizontal lines, each of the filtering counterparts being in register with each of the photo sensitive elements; and a signal processing circuit for converting the signals developing on the first and second output circuits into a composite color signal combined with a chrominance subcarrier, characterized in that the signal reading out circuit includes means for scanning the plurality of photo sensitive elements at a horizontal clock frequency which is twice the chrominance subcarrier frequency, whereby a first color difference signal between a first chrominance signal corresponding to the first filtering counterpart and a luminance signal is delivered to the first output circuit whereas a second color difference signal between a second chrominance signal corresponding to the second filtering counterpart and the luminance signal is delivered to the second output circuit, the first and second color difference signals varying at the same frequency as the chrominance subcarrier frequency; and that the signal processing circuit includes bandpass filters respectively connected to the first and second output circuits, first means for shifting by $\pi/2$ the phase of the output signal from one of the bandpass filters and adding the phase-shifted signal to the output signal from the other bandpass filter, second means for fetching a luminance signal component from the first and second output circuits, and third means for forming a composite color signal from the outputs of the first and second means and a synchronizing signal.

With the construction of this invention as set forth above, by determining the light transmittivity of the respective filtering counterparts of the mosaic color filter such that the magnitudes of the output photo signals of the corresponding photo sensitive elements are identical when a black and white object is picked up, the first and second color difference signals can be delivered out as balanced modulation waves, thereby eliminating the necessity of providing balanced modulators in the processing circuits for these color difference signals.

Additionally, according to the invention, in place of adjusting the white balance by varying the light transmittivity of each filtering counterpart, the luminance signal may be separated from the first and second chrominance signals and the magnitude of each signal may be so adjusted electrically as to obtain the balanced modulation wave.

The foregoing and other objects, advantages, manner of operation and novel features of the present invention will be understood from the following detailed description when read in connection with the accompanying drawings, in which:

FIG. 7 is a block diagram of another embodiment of the signal processing circuit of the invention; and FIG. 8 is a partial plan view showing another example of the color filter combined with the solid state imaging device in accordance with the invention.

For clarity of explanation of the difference between the present invention and the prior art, a prior art solid state color imaging apparatus will first be described with reference to FIGS. 1 to 4.

Figure 1:
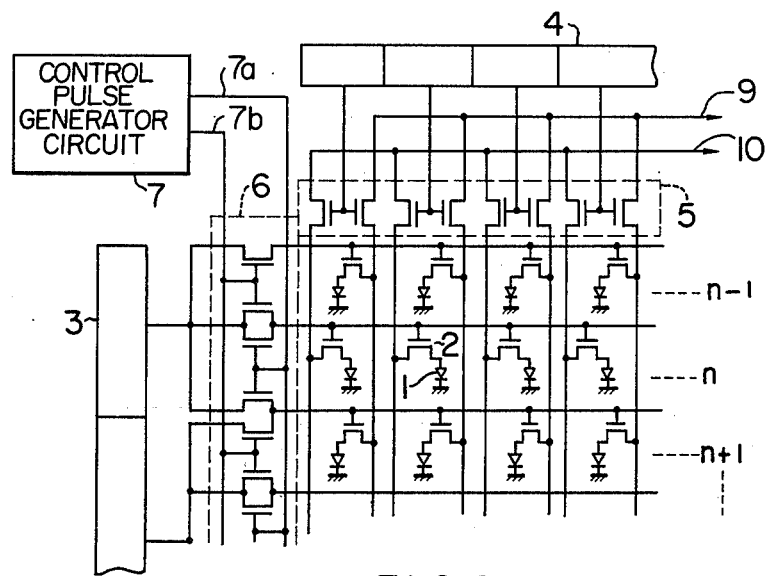
FIG. 1 is a circuit diagram of one example of a solid state imaging device which is applicable to an imaging apparatus of the invention.

Shown in FIG. 1 is a solid state imaging device as proposed in Japanese Patent Application No. 82965/'77, which has been laid open as Japanese Pat. Kokai No. 37427/'79, corresponding to U.S. patent application Ser. No. 923,982 and assinged to the same assignee as the present application. This solid state imaging device is exemplified herein as applicable to a solid state color imaging apparatus of the present invention.

The solid state imaging device comprises a plurality of photo sensitive elements and MOS type element arrays wherein the arrays on the n-th and (n+1)-th horizontal lines can be read out simultaneously. Thus, interlace scanning is accomplished by determining combinations of paired horizontal lines read out simultaneously within each field such that a pair of the n-th and (n+1)-th lines, a pair of the (n+2)-th and (n+3)-th lines,—are read out within the first field and a pair of the (n−1)-th and n-th lines, a pair of the (n+1)-th and (n+2)-th lines,—are read out within the second field.

As shown in FIG. 1, the photo sensitive elements 1 such as for example photodiodes are arranged two-dimensionally in a semiconductor substrate and vertical switching elements 2 including MOS FETs are associated with the respective photo sensitive elements 1 so that photo signals from the respective photo sensitive elements 1 can be read out. A vertical scanning circuit 3 including a shift register is adapted to generate a series of switching pulses which are applied to the gate electrode of each respective FET, i.e., the control terminal of the vertical switching element 2. Similarly, a horizontal scanning circuit 4 is adapted to generate a series of switching pulses which are applied to the control terminal of respective horizontal switching elements 5 arranged in array. A switchover circuit 6 permits the interlace scanning when controlled by a control pulse generated from a control pulse generator circuit 7 which includes a flip-flop circuit, for example. Reference numerals 9 and 10 designate output signal lines. The control pulse generator circuit 7 alternately generates pulses to be applied via lines 7a and 7b, respectively, to the control terminal of the corresponding MOS FETs constituting the switchover circuit 6.

Figure 2:
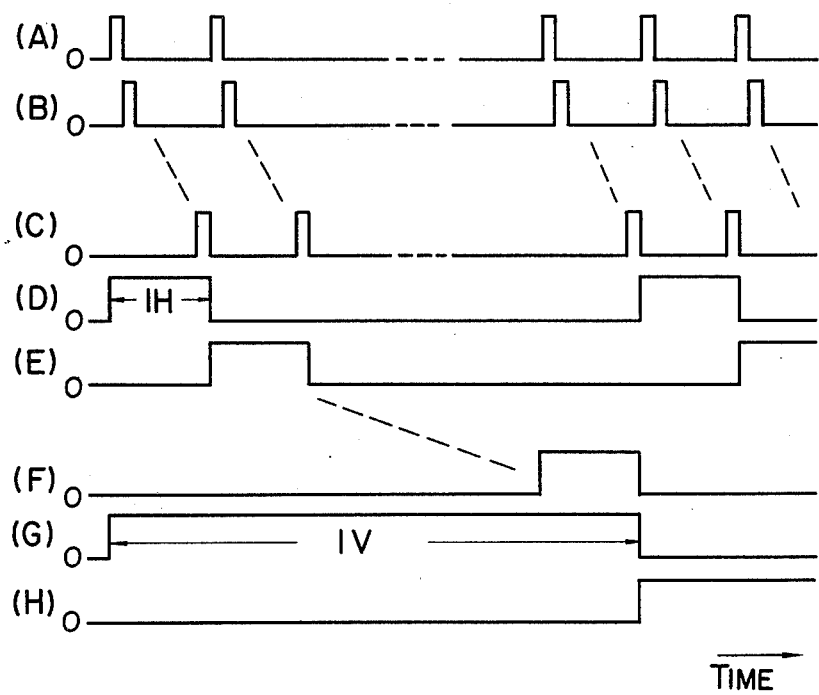
FIG. 2 illustrates in sections A through H the wave forms of driving signals in the circuit of FIG. 1.

FIG. 2 shows driving pulse wave forms in the solid state imaging device shown in FIG. 1, especially the output wave form of each stage of the horizontal scanning circuit 4 being shown in sections A through C, the output wave form of each stage of the vertical scanning circuit 3 in sections D through F, and the wave forms of the two output pulses from the control pulse generator circuit 7 in sections G and H, respectively. Under the control of these driving pulses, photo signals of the photo sensitive element arrays on the paired horizontal lines are delivered out simultaneously via the output signal lines 9 and 10.

Figures 3, 4:
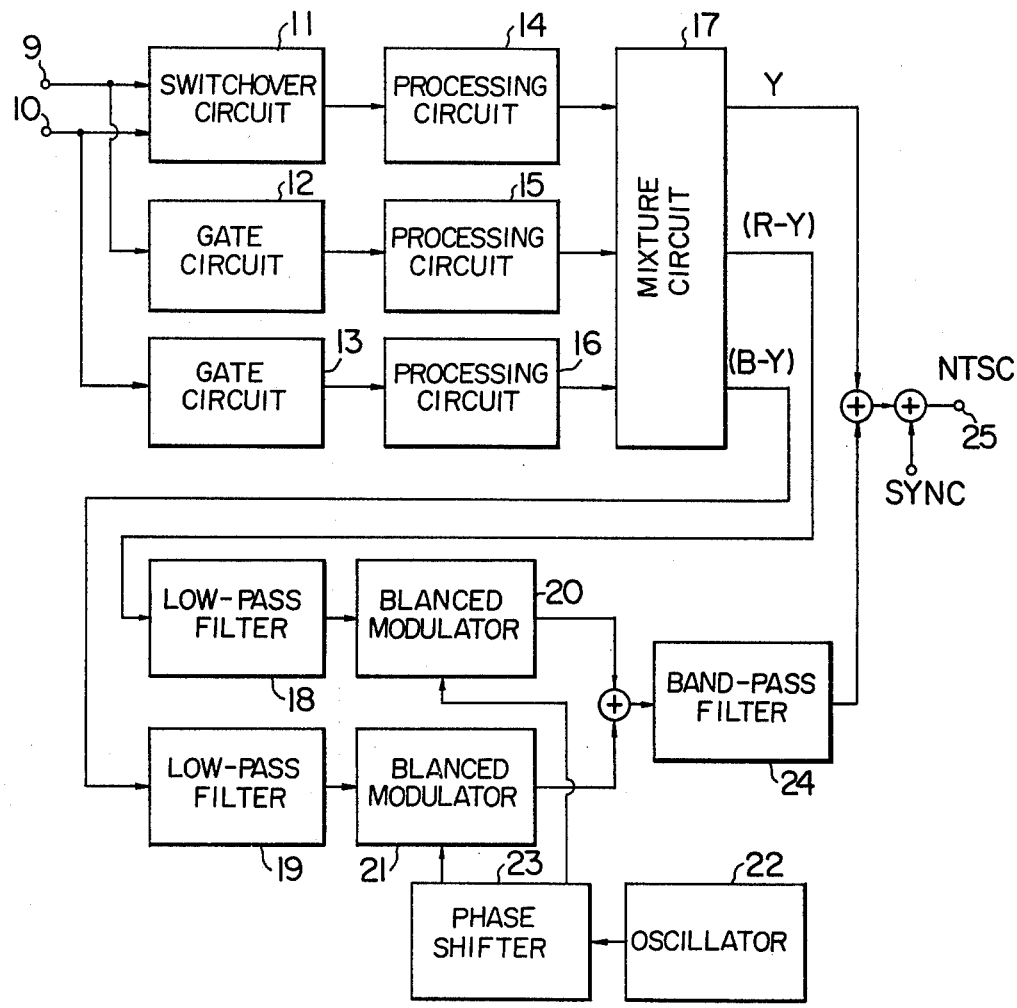
FIG. 3 is a partial plan view showing a prior art mosaic color filter combined with the solid state imaging device of FIG. 1.
FIG. 4 is a block diagram of a prior art signal processing circuit adapted to process the output signals from the solid state imaging device of FIG. 1.

Assume now that a mosaic color filter as shown in FIG. 3 is disposed in front of the solid state imaging device. The mosaic color filter has green color transmissive filtering counterparts as designated at G, red color transmissive filtering counterparts as designated at R and blue color transmissive filtering counterparts as designated at B, individual counterparts being in register with individual photo sensitive elements 1 shown in FIG. 1.

With this mosaic color filter, G and R signals are alternately delivered out via the output signal line 9 while B and G signals being alternately delivered out via the output signal line 10. A prior art signal processing circuit for deriving an NTSC composite color signal from the R, G and B signals is exemplified as shown in FIG. 4, and it comprises a switchover circuit 11 for switching over the output lines 9 and 10 in response to each picture element and fetching the G signal successively, a gate circuit 12 for fetching the R signal on the output line 9 in response to one picture element after the other, a gate circuit 13 for fetching the B signal on the output line 10 in response to one picture element after the other, processing circuits 14, 15 and 16 for processing the G, R and B signals, respectively, a matrix circuit 17 for deriving a Y signal indicative of a luminance signal and (R−Y) and (B−Y) signals indicative of color difference signals from the R, G and B signals, low-pass filters (LPF) 18 and 19, balanced modulators 20 and 21 for delivering out (R−Y) cos ωt and (B−Y) sin ωt signals, respectively, an oscillator 22, a phase shifter 23, a bandpass fiter 24, and an output terminal 25. As clearly seen from the figure, an NTSC composite color signal can be obtained from the output terminal 25.

The prior art circuit exemplified herein requires the balanced modulator 20 and 21 and the processing circuits 14, 15 and 16 associated with the G, R and B signals, resulting in a complicated circuit construction and increase in the number of circuit parts which prevent reduction in the manufacturing cost of the camera.

More particularly, the signal processing circuit of the prior art solid state color imaging apparatus comprises a demodulator circuit including the gate circuits 11, 12 and 13, the processing circuits and an encoder circuit including the circuits 17 and 24. Among these components, the processing circuits and the balanced modulators prevail. Generally, the processing circuit includes at least a clamping circuit, a blanking signal insertion circuit, and a clipper circuit. Moreover, a highly precise temperature stability is required of the processing circuit which participates in processing of the chrominance signal and it is inevitable that the processing circuit becomes expensive. In other words, in order to prevent temperature instability leading to deviation of color balance, the construction of the processing circuit is highly sophisticated.

In order to obviate the above drawbacks of the prior art solid state color imaging apparatus, the present invention contemplates a solid state color imaging apparatus wherein color video signals derived directly from a single solid state imaging device can be formed into an NTSC composite color signal through only a simplified signal processing, and a preferred embodiment thereof will be described hereinafter.

Figure 5:
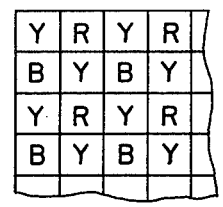
FIG. 5 is a partial plan view showing one example of a color filter combined with a solid state imaging device in accordance with the present invention.
Figure 6:
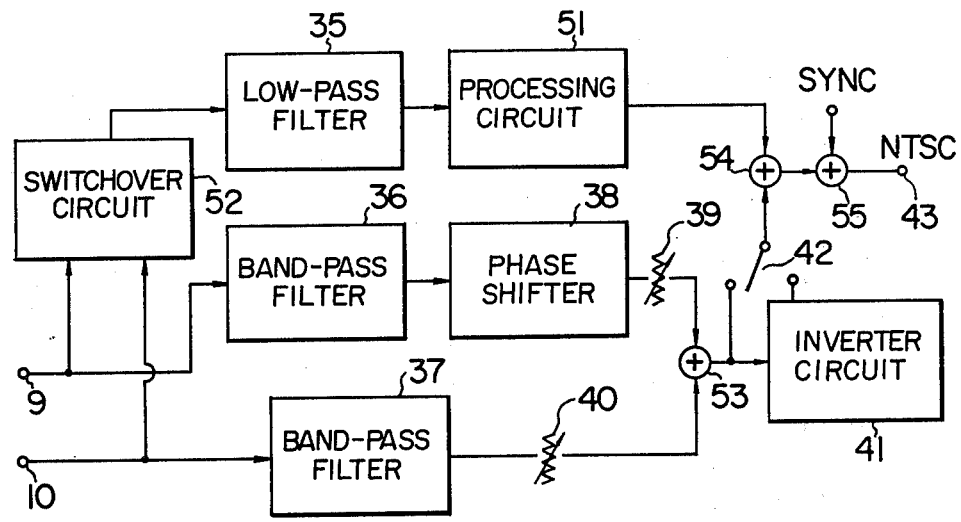
FIG. 6 is a block diagram of one embodiment of a signal processing circuit in a solid state imaging apparatus in accordance with the present invention.

FIG. 5 shows a mosaic color filter to be combined with the solid state imaging device of FIG. 1 in accordance with the invention, and FIG. 6 shows a signal processing circuit which processes the output signals from the solid state imaging device and the mosaic color filter in combination to form an NTSC composite color signal.

The mosaic color filter shown in FIG. 5 has luminance filtering counterparts as designated at Y each having a filter spectrum characteristic which causes the associated photo sensitive element to produce a chrominance signal of an R, G and B signal ratio of 0.3R+0.59G+0.11B, i.e., a luminance signal pursuant to NTSC, red color transmissive counterparts as designated at R, and blue color transmissive counterparts as designated at B. With the color filter as shown in FIG. 5, Y and R signals on the output line 9 of the solid state imaging device of FIG. 1 are delivered out alternately in response to one picture element after the other whereas B and Y signals on the output line 10 are delivered out alternately in response to one picture element after the other.

According to the present invention, the Y, R and B filtering counterparts are so adjusted in advance as to have the transmittivity of each such that the magnitudes of the Y, R and B signal outputs are identical when a black and white object being picked up. In addition, the horizontal clock pulse being delivered out from the horizontal scanning circuit 4 of the solid state imaging device shown in FIG. 1 is so designed as to have a frequency which is twice the frequency $f_s$ of the chrominance subcarrier contained in the NTSC composite color signal. Thus, for the frequency $f_s$ being 3.58 MHz, the frequency of the horizontal clock pulse is 7.16 MHz.

The signal processing circuit shown in FIG. 6 comprises a switchover circuit 52 for fetching the Y signal on the output lines 9 and 10 alternately in response to one picture element, a low-pass filter (LPF) 35, band-pass filters (BPF) 36 and 37, a phase shifter 38, coefficient units 39 and 40, a signal inverter circuit (INV) 41, a switching circuit 42, an NTSC composite color signal output terminal 43, a processing circuit for the Y signal 51, and adder circuits 53, 54 and 55.

The bandpass filters 36 and 37 pass therethrough only a band component of 3.58 MHz±500 KHz. Since the Y and R signals appear alternately on the output line 9 in accordance with the arrangement of the Y and R filtering counterparts, a color difference signal of (R−Y) cos ωt which varies at 3.58 MHz can be obtained when a colored object is picked up. On the other hand, the Y and B signals appear alternately on the output line 10. Since the position of the Y filtering counterparts is shifted by one picture element from that of the Y filtering counterpart contained in the former arrangement of the Y and R filtering counterparts, the output signal developing on the output line 10 is out of phase by π with respect to the signal on the output line 9, turning into a color difference signal of −(B−Y) cos ωt varying at 3.58 MHz.

The phase shifter 38 shifts the phase of the (R−Y) cos ωt signal by π/2 to thereby obtain the normal carrier chrominance signal pursuant to the NTSC system so that the phase difference between the (R−Y) cos ωt and −(B−Y) cos ωt signals can be π/2.

Due to the fact that the transmittivity of each filtering counterpart is designed in advance such that Y=R=B holds, the two color difference signals are zero when a black and white object is picked up and accordingly, stand for the chrominance subcarrier subject to the balanced modulation. These signals are fed to the adder circuit 53 via the coefficient units 39 and 40, respectively, and synthesized at the adder circuit 53 at a predetermined ratio.

It is to be noted that since the chrominance subcarrier frequency is made an odd multiple of the horizontal scanning frequency in the NTSC system, it is necessary to invert the phase of the chrominance carrier by 180° at the termination of one horizontal scanning period (1H). However, with the color filter shown in FIG. 5, each horizontal scanning always starts from the Y or B filtering counterpart, thereby ensuring that the chrominance subcarrier delivered out from the adder circuit 53 can take the same position within each horizontal scanning period. Therefore, according to the circuit of FIG. 6, the switching circuit 42 is so designed as to operate each time 1H terminates and the chrominance subcarrier subject to phase inversion at the phase inverter circuit 41 is allowed to be fed to the adder circuit 54.

The adder circuit 54 adds the chrominance subcarrier signal to the luminance signal having been passed through the switchover circuit 52, low-pass filter 35 and processing circuit 51. The output signal of the adder circuit 54 is further added with the synchronizing signal SYNC and color burst signal at the adder circuit 55, thereby producing an NTSC composite color signal on the output terminal 43.

As will be seen from the foregoing description, according to the apparatus of this embodiment, the signals appearing on the output lines 9 and 10 are removed of other components than the carrier (chrominance subcarrier) component after passing through the BPFs 36 and 37. Therefore, there is no need of providing the balanced modulator and the processing circuit as well. The signals having passed through the BPFs 36 and 37 have the DC component thereof removed, eliminating the necessity of fixing the DC component. The processing circuit 51 is necessary which fixes the DC component of the Y signal. This processing circuit, however, can be inexpensive and can be sufficiently simplified since it has nothing to do with the color component and never affects the color balance.

FIG. 7 shows a second embodiment of the present invention wherein the white balance (carrier balance) is adjusted electrically and in contrast to the previous embodiment, there is no need of optically designing the interrelation between transmittivities of filtering counterparts of the mosaic color filter. In FIG. 7, circuit components corresponding to those of the first embodiment are designated by the same reference numerals. Gate circuits 31, 32, 33 and 34 fetch signals on output lines 9 and 10 alternately in response to one picture element, i.e., at a frequency of 7.16 MHz and deliver out R and Y signals and B and Y signals successively. The white balance is adjusted in coefficient units 47, 48, 49 and 50.

R and Y signals and B and Y signals are then applied to the band-pass filters 36 and 37 through adder circuits 60 and 61, respectively. An oscillator 44 generates a frequency of 7.16 MHz, a frequency divider 45 performs a ½ frequency division and an inverter circuit 46 inverts the signal. The luminance signal is obtained by adding the signals on the output lines 9 and 10 at an adder circuit 52' and for this reason, in this embodiment, an accurate luminance signal meeting the NTSC system cannot be obtained but the resolution can be improved. A processing circuit 51 is exclusively adapted to process the luminance signal and in accordance with the invention, the color signal system does not require the processing circuit. In this embodiment, the switchover circuit 52 of FIG. 6 may be substituted for the adder circuit 52' for the sake of obtaining the luminance signal.

In place of the mosaic color filter as shown in FIG. 5, a mosaic color filter as illustrated in in FIG. 8 may be used to implement the present invention. The color filter of FIG. 8 has cyan color transmissive filtering counterparts as designated at $C_Y$ and yellow color transmissive filtering counterparts as designated at $Y_e$. Needless to say, $C_Y$ signal and $Y_e$ signal are equivalent to (G+B) signal and (R+G) signal, respectively.

With the color filter of FIG. 8, the $C_Y$ signal develops on the output line 9 in place of the R signal and the $Y_e$ signal develops on the output line 10 in place of the B signal. Then, these $C_Y$ and $Y_e$ signals are processed through a signal processing circuit similar to that of FIG. 6 or FIG. 7 to form an NTSC composite color signal. In this case, in contrast to the first and second embodiment, the phase of the color burst signal which acts as the reference phase is inverted by 180°. It will be appreciated that, in the circuits of FIGS. 6 and 7, the color burst signal is inserted in a stage subsequent to the switching circuit 42.

As having been described, the invention can provide the NTSC composite color signal without relying on the sophisticated signal processing and greatly contribute to miniaturization and inexpensiveness of the color television camera.

What we claim is:

1. In a solid state color imaging apparatus comprising:
   a plurality of photo sensitive elements arranged horizontally and vertically in an array;
   a signal read-out circuit scanning the plurality of photo sensitive elements of said array with parallel scanning of the photo sensitive elements arranged in sets of two horizontal lines and delivering photo signals from the photo sensitive elements to first and second output circuits associated with the two horizontal lines of the respective sets;
   a mosaic color filter having luminance filtering counterparts which alternate horizontally and vertically one after the other with one of first and second filtering counterparts which are arranged at the remaining positions of the mosaic on alternate horizontal lines, each of the filtering counterparts being in register with each of the photo sensitive elements; and
   a signal processing circuit for converting the signals developed by the first and second output circuits into a composite color signal combined with a chrominance subcarrier;
   the improvement wherein said signal read-out circuit includes means for scanning the plurality of photo sensitive elements of said array at a horizontal clock frequency which is twice the chrominance subcarrier frequency, whereby a first color difference signal between a first chrominance signal corresponding to the first filtering counterpart and a luminance signal is delivered to the first output circuit whereas a second color difference signal between a second chrominance signal corresponding to the second filtering counterpart and the luminance signal is delivered to the second output circuit, said first and second color difference signals varying at the same frequency as the chrominance subcarrier frequency; and
   wherein said signal processing circuit includes bandpass filters respectively connected to the first and second output circuits, first means for shifting by $\pi/2$ the phase of the output signal from one of the bandpass filters and for adding the phase-shifted signal to the output signal from the other bandpass filter, second means for obtaining a luminance signal component from the first and second output circuits, and third means for forming a composite color signal from the outputs of the first and second means and a synchronizing signal.

2. A solid state color imaging apparatus according to claim 1 wherein said first means comprises a phase shifter circuit for shifting by $\pi/2$ the phase of the output signal of the one bandpass filter, a first coefficient unit for attenuating the output of the phase shifter circuit at a predetermined ratio, a second coefficient unit for attenuating the output of said other bandpass filter at a predetermined ratio, and an adder circuit for adding the outputs of the two coefficient units.

3. A solid state color imaging apparatus according to claim 1 wherein said third means comprises a low-pass filter connected to the second means, a processing circuit connected to the low-pass filter, a circuit for inverting and delivering the output signal of the first means at the termination of each horizontal period, and a circuit for combining the outputs of the processing circuit and inverting circuit with the synchronizing signal.

4. A solid state color imaging apparatus according to claim 1, 2 or 3 wherein said mosaic color filter comprises luminance filtering counterparts, first filtering counterparts and second filtering counterparts having light transmittivities which cause the corresponding photo sensitive elements to produce photo signals of the same magnitudes when a black and white object is picked up.

5. A solid state color imaging apparatus according to claim 1, 2 or 3 wherein said signal processing circuit comprises means for separating the signals of the first and second output circuits into signals associated with the respective photo sensitive elements, means for adjusting the white balance between two signals separated from the output of the first output circuit and adding the two signals, and means for adjusting the white balance between two signals separated from the output of the second output circuit and adding the two signals, the output signals of the adder means being applied to the bandpass filters.

6. A solid state color imaging apparatus according to claim 1 wherein said mosaic color filter comprises lines of filter counterparts forming a first sequence of alternating luminance and red counterparts alternating with lines of filter counterparts forming a second sequence of alternating blue and luminance counterparts.

7. A solid state color imaging apparatus according to claim 1 wherein said mosaic color filter comprises lines of filter counterparts forming a first sequence of alternating luminance and cyan counterparts alternating with lines of filter counterparts forming a second sequence of alternating yellow and luminance counterparts.

* * * * *